United States Patent
Sobanski et al.

(10) Patent No.: US 11,891,953 B2
(45) Date of Patent: Feb. 6, 2024

(54) AIRCRAFT SKIN HEAT EXCHANGER

(71) Applicant: Raytheon Technologies Corporation, Farmington, CT (US)

(72) Inventors: Jon E. Sobanski, Glastonbury, CT (US); Paul R. Hanrahan, Sedona, AZ (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/584,909

(22) Filed: Jan. 26, 2022

(65) Prior Publication Data
US 2023/0235699 A1    Jul. 27, 2023

(51) Int. Cl.
F02C 7/12 (2006.01)
B64D 33/08 (2006.01)
F28D 7/00 (2006.01)

(52) U.S. Cl.
CPC .............. *F02C 7/12* (2013.01); *B64D 33/08* (2013.01); *F28D 7/0041* (2013.01); *F05D 2260/213* (2013.01)

(58) Field of Classification Search
CPC .. B64D 2033/024; B64D 33/08; B64D 33/10; F02C 7/12; F02C 7/14; F02C 7/141; F02C 7/18; F02K 1/822; F05D 2260/213; F28D 7/0041; F28D 2021/0021; F28D 2021/0026; F28D 2021/004
See application file for complete search history.

(56) References Cited

U.S. PATENT DOCUMENTS

| | | |
|---|---|---|
| 9,309,000 B2 | 4/2016 | Piesker |
| 10,011,362 B2 | 7/2018 | Piesker |
| 2003/0029607 A1* | 2/2003 | Otter ............... F28F 13/182 29/890.03 |
| 2011/0146957 A1 | 6/2011 | Buchholz et al. |
| 2017/0036775 A1 | 2/2017 | Jones et al. |
| 2017/0167382 A1* | 6/2017 | Miller ............... F02C 3/04 |
| 2018/0051716 A1 | 2/2018 | Cheung et al. |

FOREIGN PATENT DOCUMENTS

| | | |
|---|---|---|
| GB | 2581795 A | 9/2020 |
| WO | 2021032476 A1 | 2/2021 |

OTHER PUBLICATIONS

Thermex "Why counter flow heat exchangers are more efficient" accessed at http://www.thermex.co.uk/news/blog/605-why-counter-flow-heat-exchangers-are-more-efficient May 31, 2023 and first available to public as of Dec. 23, 2016 (Year: 2016).*
European Search Report for European Application No. 23152943.9 dated Jun. 1, 2023.

* cited by examiner

*Primary Examiner* — Scott J Walthour
(74) *Attorney, Agent, or Firm* — Carlson, Gaskey & Olds, P.C.

(57) ABSTRACT

An aircraft heat exchanger system according to an exemplary embodiment of this disclosure, among other possible things includes a first heat exchanger assembly that is disposed in an inlet duct assembly, and a skin heat exchanger assembly is in thermal communication with an outer surface of an aircraft structure. The skin heat exchanger is in fluid communication with the first heat exchanger such that a working fluid is communicated therebetween.

17 Claims, 3 Drawing Sheets

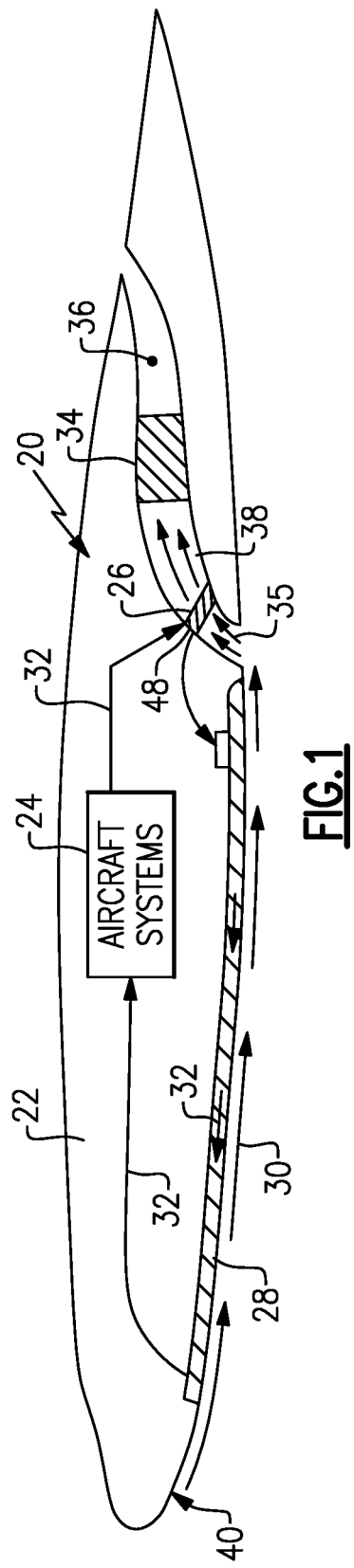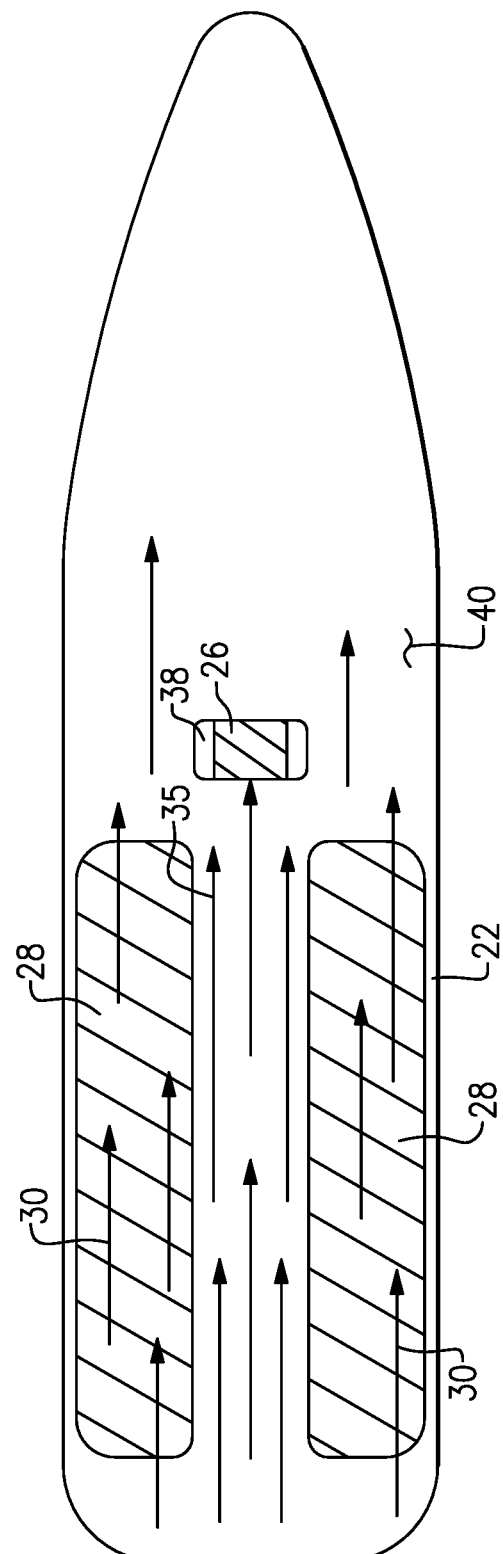

AIRCRAFT SKIN HEAT EXCHANGER

BACKGROUND

Aircraft propulsion systems use a gas turbine engine that burns carbon based fuels. The aircraft industry desires to significantly reduce carbon emissions produced by aircraft propulsion systems. Engine systems disposed in an aircraft structure provides several benefits to engine operational efficiencies. However, incorporation of propulsion systems in an airframe present challenges to existing engine architectures. Moreover, engine systems in an aircraft structure require ducts to communicate air to a propulsion system and exhaust waste gases and airflow. The size of such ducts are constrained by the aircraft structures and therefore may not provide a desired amount of airflow for cooling.

Although current engine systems have improved propulsive efficiency, aircraft engine manufacturers continue to seek further improvements to engine performance including improvements to thermal, transfer and propulsive efficiencies.

SUMMARY

An aircraft heat exchanger system according to an exemplary embodiment of this disclosure, among other possible things includes a first heat exchanger assembly that is disposed in an inlet duct assembly, and a skin heat exchanger assembly is in thermal communication with an outer surface of an aircraft structure. The skin heat exchanger is in fluid communication with the first heat exchanger such that a working fluid is communicated therebetween.

In a further embodiment of the foregoing, the skin heat exchanger is disposed along a bottom surface of the aircraft structure.

In a further embodiment of any of the foregoing, the aircraft skin is in communication with a boundary layer flow of air.

In a further embodiment of any of the foregoing, the first heat exchanger assembly includes a first outlet that communicates the working flow to an inlet of the skin heat exchanger.

In a further embodiment of any of the foregoing, the skin heat exchanger includes a second outlet that communicates the working flow to the first heat exchanger assembly.

In a further embodiment of any of the foregoing, the outer surface of the aircraft structure includes a bottom facing surface of the aircraft structure.

In a further embodiment of any of the foregoing, the skin heat exchanger assembly is black.

In a further embodiment of any of the foregoing, the heat exchanger assembly includes a second heat exchanger assembly that is disposed in the aircraft structure. The second heat exchanger is in fluid communication with the skin heat exchanger assembly.

In a further embodiment of any of the foregoing, the aircraft structure includes at least one of an aircraft fuselage or an aircraft wing.

An aircraft propulsion system according to an exemplary embodiment of this disclosure, among other possible things includes a propulsor assembly that is disposed in an aircraft structure, an inlet duct for communicating airflow to the propulsor assembly. The inlet duct is disposed in the aircraft structure. A first heat exchanger assembly is disposed in the inlet duct assembly and in thermal transfer communication with airflow through the inlet duct. A skin heat exchanger assembly is in thermal communication with an outer surface of the aircraft structure.

In a further embodiment of the foregoing, the skin heat exchanger assembly is in fluid communication with the first heat exchanger such that a working fluid is in communication therebetween.

In a further embodiment of any of the foregoing, the skin heat exchanger is disposed along a bottom surface of the aircraft structure.

In a further embodiment of any of the foregoing, the aircraft skin is in communication with a boundary layer flow of air.

In a further embodiment of any of the foregoing, the first heat exchanger assembly includes a first outlet that communicates the working flow to an inlet of the skin heat exchanger.

In a further embodiment of any of the foregoing, the skin heat exchanger includes a second outlet that communicates the working flow to the first heat exchanger assembly.

In a further embodiment of any of the foregoing, the outer surface of the aircraft structure includes a bottom facing surface of the aircraft structure.

In a further embodiment of any of the foregoing, the skin heat exchanger assembly is black.

In a further embodiment of any of the foregoing, the aircraft propulsion system includes a second heat exchanger assembly that is disposed in the aircraft structure. The second heat exchanger is in fluid communication with the skin heat exchanger assembly.

In a further embodiment of any of the foregoing, the aircraft structure includes at least one of an aircraft fuselage or an aircraft wing.

A method of transferring thermal energy from an aircraft system working fluid, the method, according to an exemplary embodiment of this disclosure, among other possible things includes transferring a first quantity of thermal energy with a first heat exchanger that is exposed to an inlet airflow through an air inlet of a propulsion system, and transferring a second quantity of thermal energy with a skin heat exchanger that is exposed to a boundary layer airflow along a surface of an aircraft structure.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 1 is a schematic view of an example aircraft heat exchanger system.

FIG. 2 is a schematic view of a bottom surface of an example aircraft structure including a skin heat exchanger assembly.

DETAILED DESCRIPTION

Figure 3:
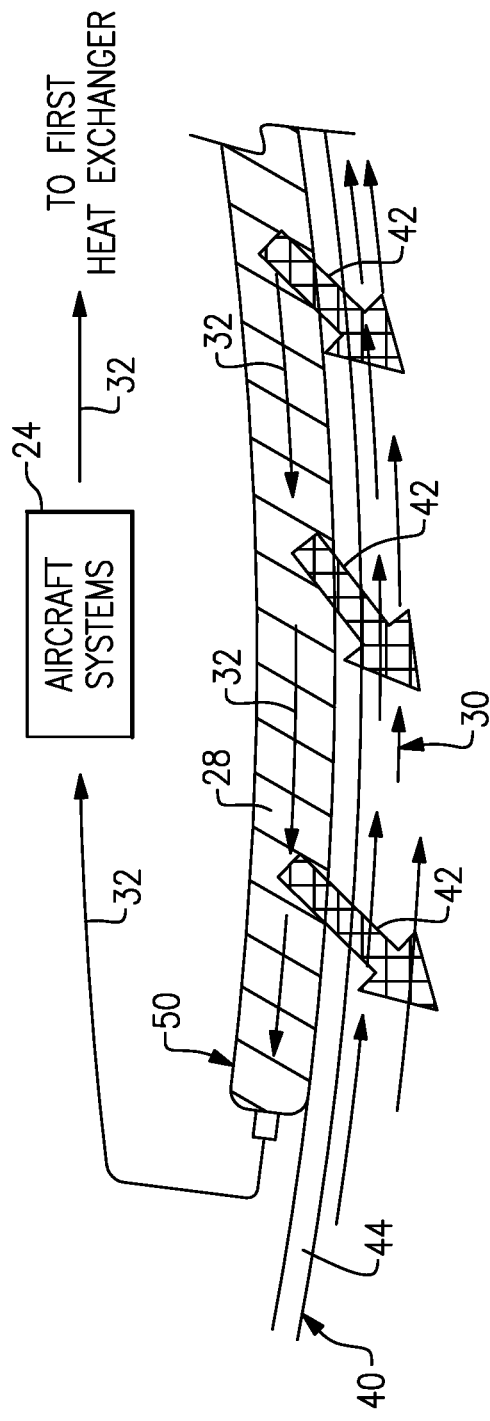
FIG. 3 is an enlarged view of a portion of an example skin heat exchanger assembly.

FIG. 1 is a schematic view of an example aircraft heat exchanger system 20 disposed in an aircraft structure 22.

The aircraft structure 22 may be the aircraft fuselage, a wing or other lifting structure. The disclosed example aircraft structure 22 includes an imbedded propulsor assembly 34 that receives air flow through an inlet duct 38. The propulsor assembly 34 creates a high energy propulsive flow that is exhausted through an exhaust duct 36. In one disclosed example, the propulsor assembly 34 is electrically powered In another disclosed example embodiment, the propulsor assembly 34 is a hybrid system that combines conventional combustion with electric power. It should be understood that although several types of propulsor assemblies are disclosed by way of example that any propulsor assembly would benefit from the heat exchanger system of this disclosure and are within the contemplation of this disclosure.

The inlet duct 38 is sized to provide a desired amount of airflow to the propulsor assembly 34. The size over the inlet duct 38 is constrained by the size and shape of the aircraft structure 22. Accordingly, exposure to inlet airflow is limited by the size of the inlet duct 38. The constrained amount of airflow may limit a thermal capacity of a heat exchanger system required to cool and transfer heat produced by various aircraft systems 24. The aircraft systems 24 are shown schematically and may include lubricant, cooled cooling air, buffer cooling air and any other aircraft systems that transfer thermal energy to operate efficiently. A disclosed example heat exchanger system embodiment provides for increased thermal transfer capacity without modifications to the inlet duct 38.

The example heat exchanger system 20 includes a first heat exchanger assembly 26 that is disposed in the inlet duct 38 and in thermal communication with an airflow 30 such that some airflow portion 35 is ingested into inlet duct 38. A skin heat exchanger assembly 28 is disposed along an outer bottom surface 40 of the aircraft structure 22 and in thermal communication with the airflow 30. The first heat exchanger assembly 26 and the skin heat exchanger assembly 28 are in fluid communication such that a working fluid 32 flows between the first heat exchanger assembly 26 and the skin heat exchanger 28. The working fluid 32 may include lubricant, fuel, hydraulic fluid as well as other flows that require thermal transfer of heat for efficient operation.

In one disclosed example, a working fluid 32 is communicated first through the first heat exchanger assembly 26. The first heat exchanger assembly 26 transfers some quantity of thermal energy into the ingest airflow 35. The amount of thermal energy transferred may be sufficient to provide efficient operation. However, should additional thermal energy transfer be required, the working fluid 32 may be communicated to the skin heat exchanger assembly 26. In one disclose example, the first heat exchanger 26 provides between 80% and 100% of the required thermal transfer capacity desired to sufficiently cool the working fluid 32 and the skin heat exchanger assembly provides the remaining thermal transfer capacity. In another disclosed embodiment, the first heat exchanger 26 provides between 85% and 90% of the required thermal transfer capacity and the skin heat exchanger assembly provides the remaining 15% to 10%. As appreciated, other combinations of heat transfer capacity may be utilized and are within the contemplation of this disclosure.

Referring to FIGS. 2 and 3 with continued reference to FIG. 1, the example heat transfer system 20 includes the skin heat exchanger 28 disposed on a bottom surface of the aircraft structure 22. The skin heat exchanger 28 may have any shape, width and length that provides a desired thermal transfer capacity. The bottom surface 40 is typically not exposed to sunlight for extended periods of time and therefore is where the example skin heat exchanger 28 is mounted.

In this disclosed example, the skin heat exchanger 28 is disposed on either side of the inlet 38. The offset placement of the skin heat exchanger 28 provides for non-heated boundary layer airflow 35 to be communicated into the inlet 38. Accordingly, airflow that has accepted heat through contact with the skin heat exchanger 28 is not substantially communicated into the inlet 38. The inlet 38 and thereby the first heat exchanger 26 is not provided with preheated air. It should be appreciated that it is within the contemplation and scope of this disclosure that the skin heat exchanger 28 may be located in other portions of the aircraft structure 22 that do not result in preheated air being communicated into the inlet 38.

Moreover, the thermal transfer of heat through the skin 44 provided by the disclosed skin heat exchanger 28 may be utilized to provide additional functions that make use of the communicated thermal energy. In one disclosed example, the skin heat exchanger 28 may provide anti-icing functions to prevent ice build up on portions of the aircraft structure 22. The skin heat exchanger 28 may be located, at least partially, on a leading edge of a wing or other lift generating structure of the aircraft structure 22 to provide an anti-icing function. Moreover, other beneficial uses of the thermal energy transferred through the skin 44 may be utilized by providing a specific location of the skin heat exchanger 28 and are within the scope and contemplation of this disclosure.

The skin heat exchanger 28 is placed in direct thermal transfer contact with a skin 44 of the aircraft structure 22. The direct contact with the skin 44 provides for thermal contact with the boundary layer flow 30 generated during aircraft operation. The working fluid 32 is flowed through the skin heat exchanger 28 in a forward direction that opposes the boundary layer flow 30. Stated another way, the working fluid 32 is flowed from an aft position toward a forward location that is opposite the flow 30 along the outer skin 44. Thermal energy illustrated by arrows 42 is transferred into the flow 30 and the cooled working fluid 32 is communicated back to the corresponding aircraft system 24.

The skin heat exchanger 28 may be configured with multiple channels and passages for the working fluid 32 that are placed in thermal communication with the skin 44 and thereby the flow 30. It should be appreciated, that the skin heat exchanger 28 may be constructed of any applicable, known, thermal transfer materials and structures and all such materials and configurations are within the contemplation and scope of this disclosure.

The disclosed example skin heat exchanger 28 is black to provide the advantageous thermal absorption properties associated with black body radiation. In this disclosed example, the black body of the skin heat exchanger is schematically indicated at 50.

Moreover, the skin heat exchanger 28 provides the increased thermal transfer capacity without introducing any additional aerodynamic drag. Furthermore, the skin heat exchanger is advantageous for cooling working fluids 32 that operate most efficiently when brought to ambient temperatures due to the large surface areas and high convective cooling rates during aircraft operation.

Figure 4:
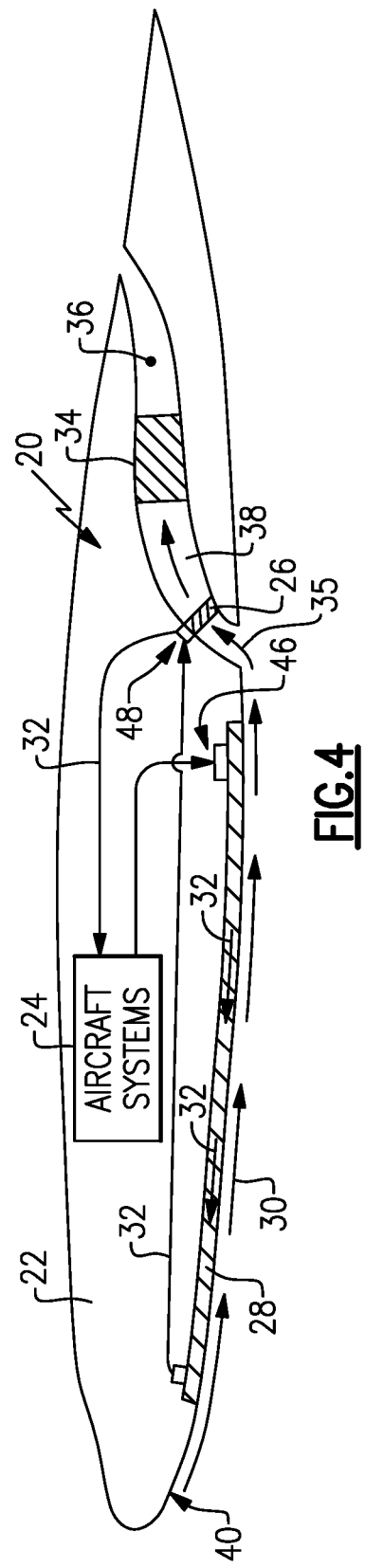
FIG. 4 is a schematic view of another example aircraft heat exchanger system.

Referring to FIG. 4, the example heat exchange system 20 is shown with the working fluid 32 first being communicated to an inlet 46 of the skin heat exchanger assembly 28. The working fluid 32 is communicated forward and then back to the first heat exchanger assembly 26 disposed in the inlet duct 38. Accordingly, in this disclosed embodiment, the working fluid 32 is initially cooled and then cooled completely by the first heat exchanger assembly 26. The different configurations of working fluid flow 32 are possible to combine the thermal transfer capacities of the first heat exchanger assembly 26 and the skin heat exchanger assembly 28. As appreciated, other routing and communication of the working fluid between the first heat exchanger assembly 26 and the skin heat exchanger assembly 28 are possible and within the scope and contemplation of this disclosure.

Figure 5:
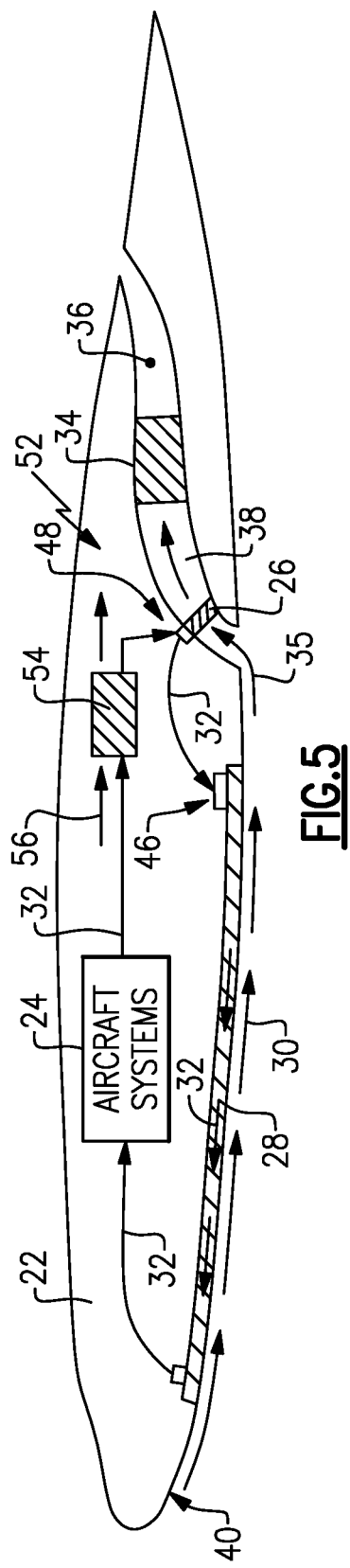
FIG. 5 is a schematic view of another example aircraft heat exchanger system.

Referring to FIG. 5, another heat exchanger system 52 is schematically shown and includes a second heat exchanger 54. The second heat exchanger 54 is in thermal communication with another cooling flow 56 and with the working fluid 32. The second heat exchanger assembly 54 may include a single heat exchanger or multiple heat exchangers that are utilized to further transfer thermal energy. In this disclosed example, the working fluid 32 is communicated from the aircraft systems 24 to the second heat exchanger 54 where it is cooled by the cooling flow 56. The working fluid 32 is then communicated to an inlet 48 of the first heat exchanger 26 for additional transfer of thermal energy. The working fluid 32 is then routed to inlet 46 for further thermal transfer by the skin heat exchanger 28. As appreciated, routing of the working fluid 32 may be controlled by various valves and conduits to select some combination of the heat exchangers required to transfer thermal energy as desired.

Accordingly, the disclosed example heat exchanger systems provide for increased thermal efficiencies within the size constraint arising from alternate propulsor mounting and limited inlet duct size. Additionally, disclosed heat exchanger system embodiments provide for use of smaller heat exchangers in engine inlet ducts while the skin heat exchanger assembly 28 does not increase drag and thereby further provides for increased engine efficiencies.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft heat exchanger system comprising:
   a first heat exchanger assembly disposed in an inlet duct assembly, the inlet duct assembly comprising an inlet opening through a bottom outer surface of an aircraft structure, the first heat exchanger assembly in thermal communication with an inlet airflow flowing through the inlet duct assembly; and
   a skin heat exchanger assembly disposed along the bottom outer surface of the aircraft structure, the skin heat exchanger assembly offset relative to the inlet duct assembly and the first heat exchanger assembly, the skin heat exchanger assembly in fluid communication with the first heat exchanger assembly such that a working fluid is communicated therebetween.

2. The aircraft heat exchanger system as recited in claim 1, wherein the bottom outer surface of the aircraft structure is in thermal communication with a boundary layer flow of air.

3. The aircraft heat exchanger system as recited in claim 1, wherein the first heat exchanger assembly includes a first outlet that communicates the working flow to an inlet of the skin heat exchanger assembly.

4. The aircraft heat exchanger system as recited in claim 1, wherein the skin heat exchanger assembly includes a second outlet that communicates the working flow to the first heat exchanger assembly.

5. The aircraft heat exchanger system as recited in claim 1, wherein the skin heat exchanger assembly is black.

6. The aircraft heat exchanger system as recited in claim 1, further including a second heat exchanger assembly disposed in the aircraft structure, the second heat exchanger assembly in fluid communication with the skin heat exchanger assembly.

7. The aircraft heat exchanger system as recited in claim 1, wherein the aircraft structure comprises at least one of an aircraft fuselage or an aircraft wing.

8. The aircraft heat exchanger system as recited in claim 1, wherein the first heat exchanger assembly includes a first outlet that communicates the working flow to an inlet of the skin heat exchanger assembly and the skin heat exchanger assembly includes a second outlet that communicates the working flow to the first heat exchanger assembly, wherein the second outlet of the skin heat exchanger assembly is forward of the inlet such that the working fluid flows forward opposite a direction of a boundary layer flow.

9. The aircraft heat exchanger system as recited in claim 1, wherein the skin heat exchanger assembly is disposed aircraft forward of the inlet duct assembly.

10. The aircraft heat exchanger system as recited in claim 1, wherein the first heat exchanger assembly and the skin heat exchanger assembly include a combined thermal transfer capacity with the first heat exchanger assembly providing more thermal transfer capacity than the skin heat exchanger assembly.

11. The aircraft heat exchanger system as recited in claim 10, wherein the first heat exchanger assembly provides more than 80% of the combined thermal transfer capacity.

12. The aircraft heat exchanger system as recited in claim 10, wherein the skin heat exchanger assembly provides less than 20% of the combined thermal transfer capacity.

13. An aircraft system comprising:
    a propulsor assembly disposed in an aircraft structure;
    an inlet duct assembly configured to communicate airflow to the propulsor assembly, the inlet duct assembly comprising an inlet opening through a bottom outer surface of the aircraft structure;
    a first heat exchanger assembly disposed in the inlet duct assembly and in thermal communication with an inlet airflow flowing through the inlet duct assembly; and
    a skin heat exchanger assembly disposed along the bottom outer surface of the aircraft structure in thermal communication with the bottom outer surface of the aircraft structure and in fluid communication with the first heat exchanger assembly such that a working fluid is communicated therebetween, wherein the skin heat exchanger assembly is offset relative to the inlet duct assembly and the first heat exchanger assembly.

14. The aircraft system as recited in claim 13, wherein the bottom outer surface of the aircraft structure is in communication with a boundary layer flow of air.

15. The aircraft system as recited in claim 13, wherein the first heat exchanger assembly includes a first outlet that communicates the working flow to an inlet of the skin heat exchanger assembly.

16. The aircraft system as recited in claim 15, wherein the skin heat exchanger assembly includes a second outlet that communicates the working flow to the first heat exchanger assembly.

17. The aircraft system as recited in claim 13, wherein the aircraft structure comprises at least one of an aircraft fuselage or an aircraft wing.

* * * * *